United States Patent
Feng et al.

(10) Patent No.: US 8,682,620 B2
(45) Date of Patent: Mar. 25, 2014

(54) METHOD FOR DESIGNING EXTRUSION DIES

(75) Inventors: Jianjun Feng, West Chester, OH (US); Eric Paul Granberg, Springfield, OH (US); Maxwell Joseph Wingert, Liberty, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 571 days.

(21) Appl. No.: 12/949,851

(22) Filed: Nov. 19, 2010

(65) Prior Publication Data
US 2012/0130684 A1    May 24, 2012

(51) Int. Cl.
*G06F 17/50* (2006.01)
*G06F 7/66* (2006.01)

(52) U.S. Cl.
USPC ............................................. 703/1; 700/196

(58) Field of Classification Search
USPC ............................................. 703/1; 700/196
See application file for complete search history.

(56) References Cited

U.S. PATENT DOCUMENTS

| | | | |
|---|---|---|---|
| 5,926,393 | A | 7/1999 | Wang et al. |
| 6,704,693 | B1 | 3/2004 | Fan et al. |
| 2009/0210189 | A1 | 8/2009 | Ganvir et al. |

FOREIGN PATENT DOCUMENTS

| | | |
|---|---|---|
| DE | 10006162 | 8/2001 |
| JP | 4102179 | 3/1992 |
| JP | 4102180 | 3/1992 |
| WO | WO 0129712 | 4/2001 |
| WO | WO 2006/064885 | 6/2006 |

OTHER PUBLICATIONS

Wang, Qi et al., "Analysis of the Fluid-Structure Interaction in the Optimization-Based Design of Polymer Sheeting Dies", 2006, Journal of Applied Polymer Science, vol. 103, Wiley Periodicals, Inc., Wiley InterScience.*
Gifford, W.A., "A Three-Dimensional Analysis of the Effect of Die Body Deflection in the Design of Extrusion Dies", 1998, Polymer Engineering and Science, Oct. 1998, vol. 38, No. 10.*
Valette, R. et al., "Experimental Investigation of the Development of Interfacial Instabilities in Two Layer Coextrusion Dies", 2004, Intern. Polymer Processing XIX, Hanser Publishers, Munich.*
Ananthasayanam, Balajee, "Computational Modeling of Precision Molding of Aspheric Glass Optics", Dec. 2008, Mechanical Engineering, Clemson University, pp. 68-73.*

(Continued)

*Primary Examiner* — David Silver
*Assistant Examiner* — Cedric D Johnson
(74) *Attorney, Agent, or Firm* — Andres E. Velarde; Megan C. Hymore; James Oehlenschlager

(57) ABSTRACT

A method of designing a die cavity that may include performing a flow analysis using characteristics of a predetermined die cavity, density and rheological properties of a material, and a flow rate of the material to calculate the pressure distribution exerted on the die cavity and cross-sectional flow profile. The method further includes a structural analysis using the calculated pressure distribution and structural characteristics of the die cavity to calculate a deformed die cavity. The flow analysis is repeated using the characteristics of the deformed die cavity to calculate a pressure distribution exerted on the die cavity and cross-sectional flow profile. The outcome is compared to determine if the pressure distributions and/or cross-sectional flow profiles converge. These steps are iteratively repeated until convergence of the pressure and/or cross-sectional flow profile is observed. The variation of the cross-sectional flow profile is analyzed to determine if it is below a predetermined tolerance.

19 Claims, 12 Drawing Sheets

Add one piece plate

(56) References Cited

OTHER PUBLICATIONS

Lebaal, Nadhir et al., Design and Optimization of Three-Dimensional Extrusion Dies, using Constraint Optimization Algorithm, Dec. 5, 2008, Finite Elements in Analysis and Design 45, Elsevier B.V.*

Beznosko, D. et al., "FNAL-NICADD Extruded Scintillator", 2004, IEEE.*

"Mechanical Design of Extrusion Dies," pp. 305-327.

Gifford, "A Three-Dimensional Analysis of the Effect of Die Body Deflection in the Design of Extrusion Dies," Polymer Engineering and Science, vol. 38, No. 10, pp. 1729-1739 (Oct. 1998).

Liu, et. al., "A Unified Lubrication Approach for the Design of a Coat-Hanger Die," Polymer Engineering and Science, vol. 34, No. 7, pp. 541-550 (Apr. 1994).

Matsubara, "Geometry Design of a Coat-Hanger Die with Uniform Flow Rate and Residence Time Across the Die Width," Polymer Engineering and Science, vol. 19, No. 3, pp. 169-172 (Feb. 1979).

Rakos, et. al., "Design and Optimization of Extrusion Dies Using Computer Based Simulations," Advances in Polymer Technology, vol. 10, No. 4, pp. 297-307 (1990).

Wang, et al., "Analysis of the Fluid-Structure Interaction in the Optimization-Based Design of Polymer Sheeting Dies," Journal of Applied Polymer Science, vol. 103, pp. 3994-4004 (2007).

\* cited by examiner

METHOD FOR DESIGNING EXTRUSION DIES

FIELD OF THE INVENTION

The invention relates to a method for designing extrusion dies.

BACKGROUND OF THE INVENTION

Extrusion dies operating under high pressure often experience a significant amount of distortion. This observed distortion can be particularly prevalent when extruding viscous fluids through relatively wide die cavities having narrow internal flow channels. Such distortion can significantly affect the cross-sectional thickness profile of the extruded material upon exiting the die, which can result in undesirable variations in the extruded sheet.

The design of dies to overcome such deflection has been challenging, particularly when using predictive simulations. For many dies, there is a consistent discrepancy between simulated calculations of the cross-sectional flow profile and the actual, measured cross-sectional flow profile of a die as viscous fluids flow through an extrusion die. The discrepancy becomes more pronounced as the width of the die increases compared to the die body thickness. Prior art simulation models using either conventional Power-law fluid model, or even the more complicated Herschel-Bulkley model and thixotropic models do not resolve this observed discrepancy. As a result of the discrepancies between the simulated and measured values, the prior art simulation methods have been unsuccessful at providing optimized solutions to determine die cavities for uniform thickness extrusion.

SUMMARY OF THE INVENTION

In accordance with an embodiment of the disclosure, a method of designing a die includes a) receiving on a computer device a first set of flow analysis data inputs related to characteristics of a geometry of a predetermined die cavity design, a density and rheological properties of a material to be extruded through the die, and a flow rate of the material, and b) performing a first three-dimensional flow analysis comprising calculating from the first set flow analysis of data a first pressure distribution exerted on the die cavity by the material to be extruded through the die and a first cross-sectional flow profile at the exit of the die cavity. The method further includes c) receiving on the computer device a set of structural analysis data inputs related to die constraint forces exerted on the die cavity and material properties of the die cavity, d) performing a structural analysis comprising calculating from the calculated first pressure distribution and the set of structural analysis data a deformation of the die cavity resulting from the first pressure distribution, and e) receiving on the computer device a second set of flow analysis data inputs related to characteristics of a geometry of the die cavity having the calculated deformation, a density and rheological properties of a material to be extruded through the die, and the flow rate of the material. The method also include f) performing a second three-dimensional flow analysis comprising calculating from the second set of flow analysis data inputs a second pressure distribution exerted on the die cavity having the calculated deformation by the material to be extruded through the die and a second cross-sectional flow profile at the exit portion of the die cavity, and g) comparing at least one of (1) the first and second pressure distributions to determine if a difference between the first and second pressure distributions is less than a predetermined pressure difference value and (2) the first and second cross-sectional flow profiles to determine if a difference between the first and second cross-sectional flow profiles is less than a predetermined difference value. Steps c)-e) of the method can be repeated using the pressure distribution calculated in step f) and the deformation calculated in step b) until at least one of (1) a difference between a pressure distribution calculated in step b) and a pressure distribution calculated in step e) is less than the predetermined pressure difference value, and (2) a difference between a cross-sectional flow profile calculated in step b) and a cross-sectional flow profile calculated in step f) is less than the predetermined difference value. Finally, the method includes h) analyzing the second cross-sectional flow profile to determine whether a variance in the profile is within a predetermined tolerance range.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
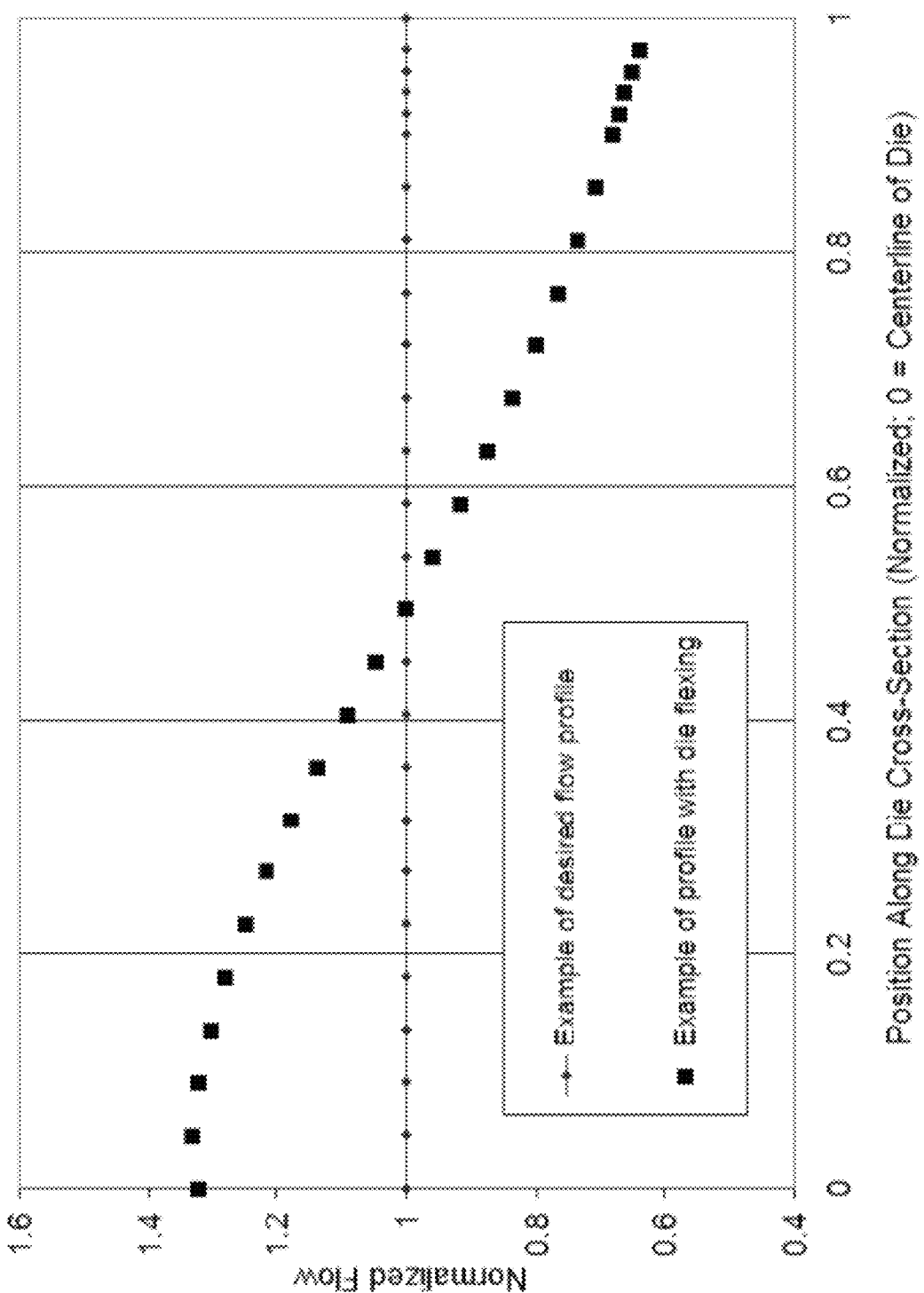
FIG. 1 is a graph illustrating an example of a uniform cross-sectional flow profile (labeled desired flow profile) and an example of a cross-sectional flow profile resulting from die flexing (labeled profile with die flexing)

It has been observed that die flexing or deformation is most significant at the center of the exit portion of the die cavity, which results in less resistance to flow and consequently an undesirable increase in the amount of material extruded in the center of the exit portion of the die cavity. The cross-sectional flow is the integrated volumetric flow rate across the exit portion of the die cavity. As used herein "cross-sectional flow profile" refers to the curve of the fluid flowrate flux as a function of the location along the width of the die. Referring to FIG. 1, a die can be designed to generate a uniform, for example, linear, cross-sectional flow profile. However, as also shown in FIG. 1, as a result of die flexing, dies generally exhibit a cross-sectional flow profile that is not linear.

Figure 4:
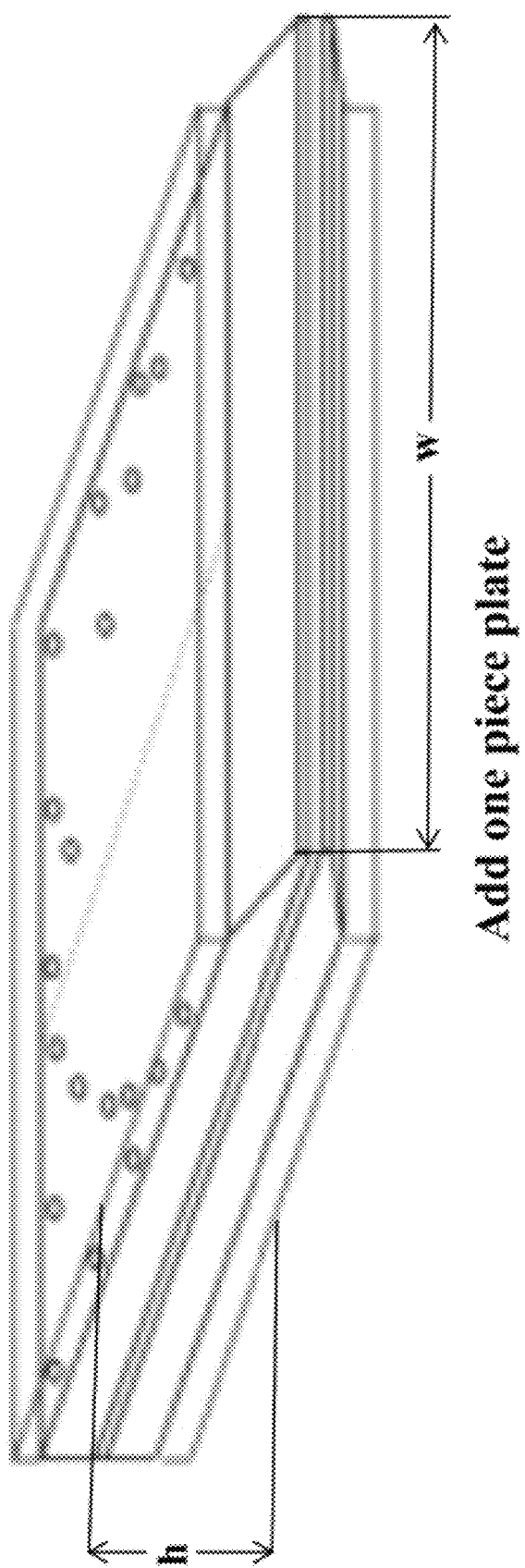
FIG. 4 is a schematic illustration of a modification to the die cavity applied to improve the cross-sectional flow profile of the die cavity.

Without intending to be bound by theory, it is believed that the die flexing is caused at least in part by the hydrodynamic pressure applied to the die cavity during the extrusion process. The die deformation due to hydrodynamic force is more significantly observed for extrusion of a polymer melt. For example, viscous fluids, such as polymer melts, filled polymer melts, polymer solutions, emulsions, high internal phase emulsions (HIPEs), hydrogels, pastes, and slurries, require a significant amount of pressure to drive the flow of the material inside the die cavity. Such pressure can cause significant deformation of a die, particularly at the center of the die. The die deformation can be particularly significant in dies having wide die cavities and thin die thicknesses. For example, such deformation can be particularly significant in a die cavity having an inside width w to total die thickness h ratio (also referred to herein as the die width aspect ratio) of about 15. As shown in FIG. 4, as used herein, the "inside width of the die cavity w" is the internal width of the die cavity at the exit portion of the die cavity. As used herein, the "total die thickness h" is the thickness of the die as measured at the main body portion of the die. The total die thickness can include, for example, modifications made to the die to increase the die thickness, such as the one-piece plate shown in FIG. 4. The ratio of the inside width of the die to the total die thickness is referred to herein as the "die width aspect ratio." The die width aspect ratio can be about 5 to about 20, about 8 to about 15, or about 9 to about 12. Other suitable die width aspect ratios can include about 5, 6, 7, 8, 9, 10, 11, 12, 13, 14, 15, 16, 17, 18, 19, and 20. The deformation can also be significant when the dies are made out of materials that are weaker than steel, such as aluminum, because such materials provide less resistance against deformation.

Disclosed herein is a method for designing extrusion dies to overcome one or more of the aforementioned problems of the prior art. Specifically, embodiments of the method provide a model in which there is no or insignificant discrepancies between the calculated cross-sectional flow profile at the exit of the die cavity and the actual, measured cross-sectional flow profile. Thus, embodiments of the method make it possible to design an optimized die cavity to overcome the observed deformation and improve the ability of the die to uniformly extrude material.

Figure 2:
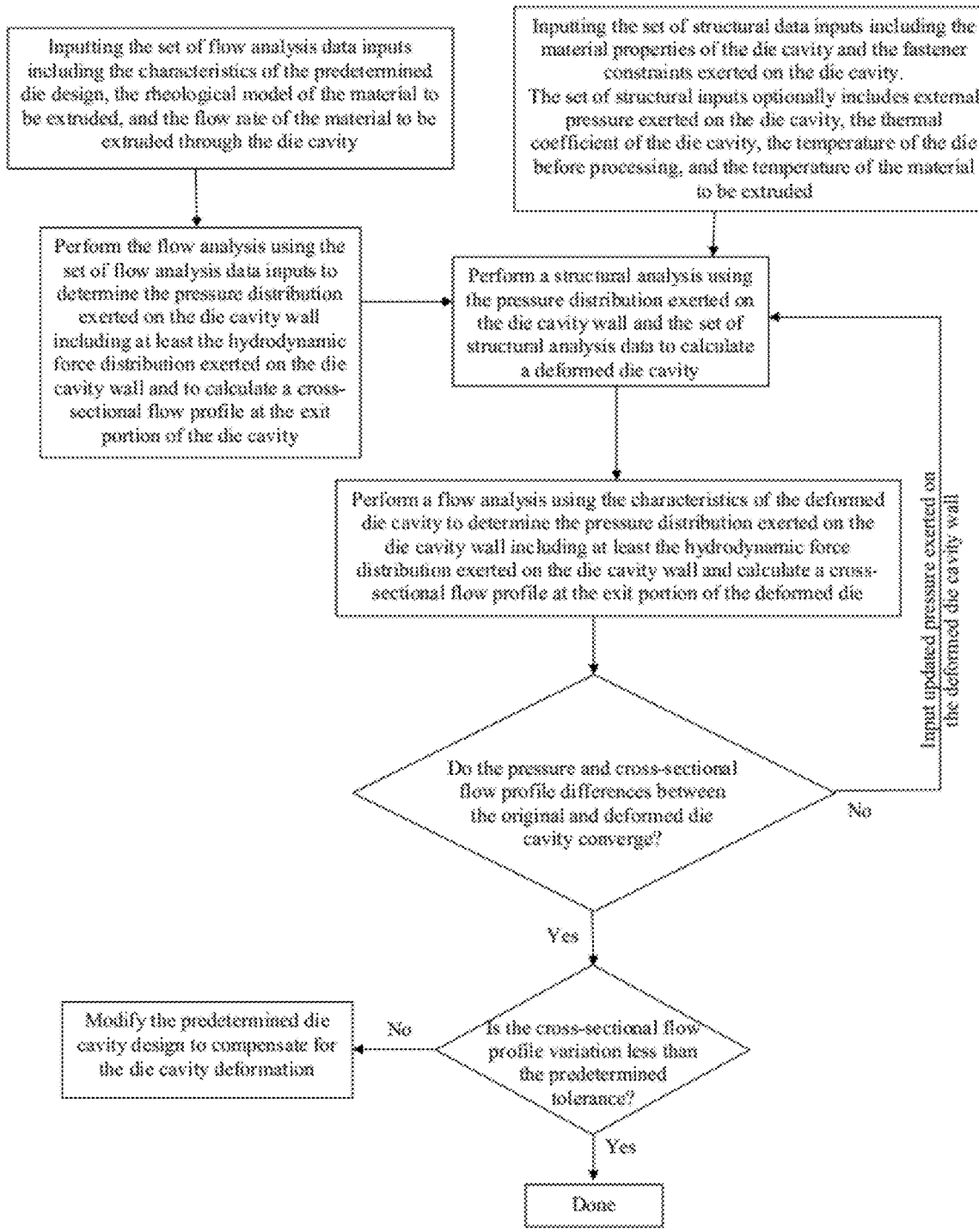
FIG. 2 is a flow chart illustrating a method of designing a die cavity in accordance with an embodiment of the disclosure.
Figure 3A:
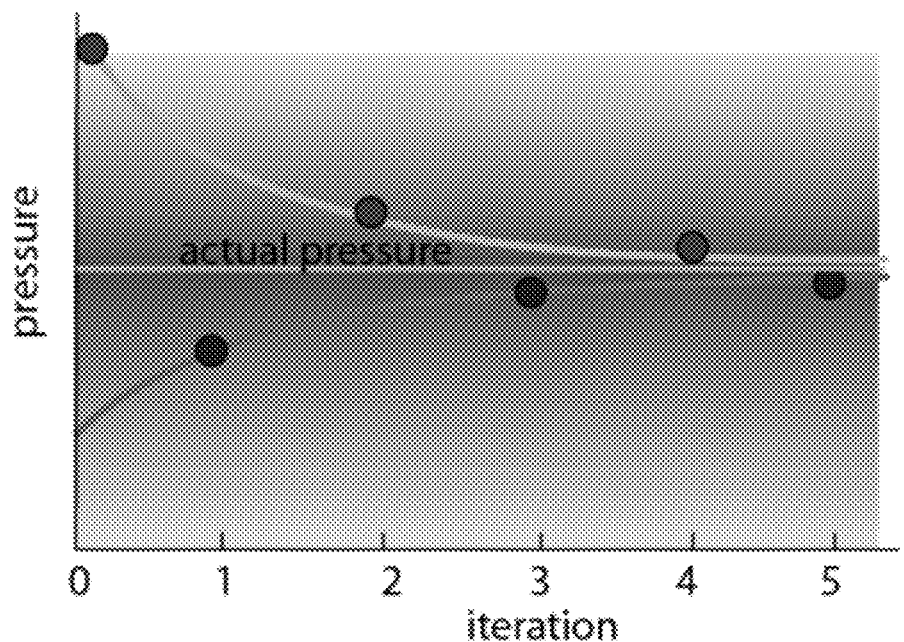
FIG. 3A is a graph illustrating convergence of the pressure exerted on the die cavity wall calculated using successive iterations of a method of designing a die cavity in accordance with an embodiment of the disclosure.
Figure 3B:
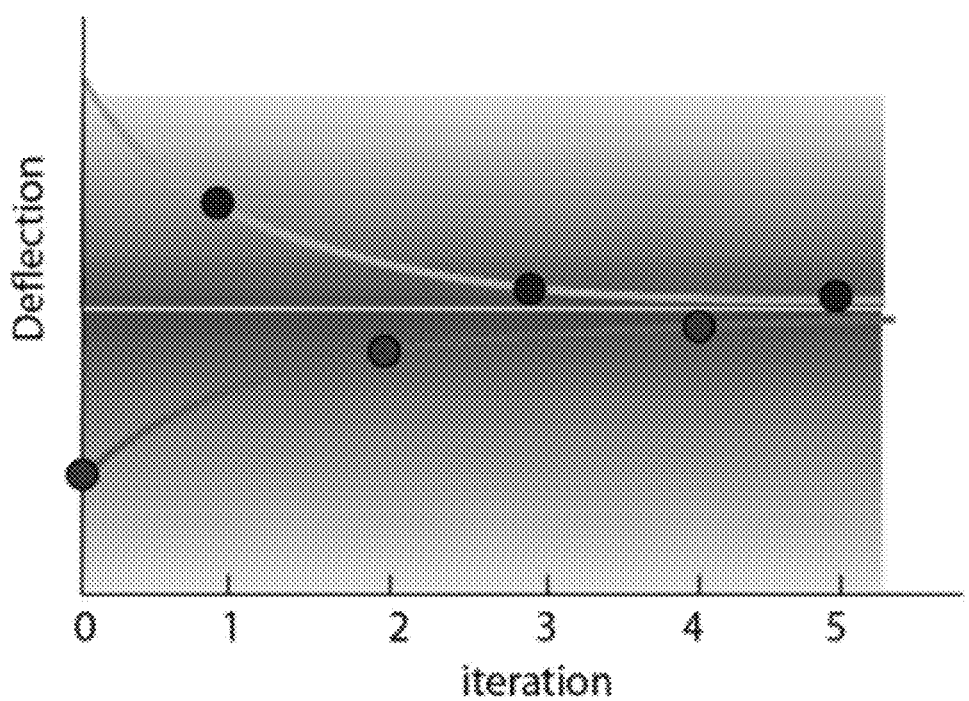
FIG. 3B is a non-Cartesian graph illustrating convergence of the deflection of the die cavity calculated using successive iterations of a method of designing a die cavity in accordance with an embodiment of the disclosure.

Referring to FIG. 2, in one embodiment, the method includes receiving or inputting on a computer device a set of flow analysis data inputs related to the characteristics of a geometry of a predetermined die cavity, a density of the material to be extruded through the die, rheological properties of the material to be extruded through the die, and a flow rate of the material to be extruded through the die and performing a flow analysis that includes calculating from the set of flow analysis data inputs a pressure distribution exerted on the die cavity wall including at least a hydrodynamic force exerted on the die cavity wall. In one embodiment, the flow analysis is a three-dimensional flow analysis. The method further includes receiving or inputting on the computer device a set of structural analysis data inputs related to the material properties of the die and the fastening constraints exerted on the die, and performing a structural analysis that includes calculating from the calculated pressure exerted on the die cavity wall, the set of structural analysis data inputs, and optionally external pressures exerted on the die cavity wall a deformation of the die cavity resulting from the pressures exerted on the die cavity. External forces acting on the die cavity, such as, for example, gravity, can be included to provide a more robust analysis. For example, the method can include receiving an external forces set of data inputs related to additional external forces exerted on the die cavity prior to performing the structural analysis. In one embodiment, the structural analysis is a thermal structural analysis, which accounts for deformation of the die cavity resulting from thermal expansion. A set of data related to the characteristics of geometry of the deformed die cavity are then received or input into the computer device and another flow analysis is performed. The flow analysis includes calculating from the new set of data inputs the cross-sectional flow profile at the exit portion of the deformed die cavity and the pressure distribution exerted on the deformed die cavity wall, including at least the hydrodynamic pressure exerted on the deformed die cavity wall. The calculated pressure distribution and cross-sectional flow profile for the deformed die cavity and the predetermined die cavity are compared to determine if the values converge. If the values do not converge, then the structural analysis is repeated using the calculated pressure exerted on the deformed die cavity wall along with a set of structural analysis data inputs related to the material properties of the die and the fastening constraints on the die cavity having the calculated deformation to calculate a second deformed die cavity. The flow analysis is then performed using a set of inputs related to characteristics of the second deformed die cavity, and the calculated pressure and cross-sectional flow profile for the second deformed die cavity are compared to the calculated pressure and the cross-sectional flow profile for the deformed die cavity to determine if the values converge. The flow analysis is considered converged when the maximum difference between the calculated pressure distributions is less than a predetermined pressure difference value and/or the difference between the calculated cross-sectional flow profiles is less than a pre-determined difference value. The predetermined pressure difference value can be, for example, about 10%. The difference between the cross-sectional flow profiles can be calculated, for example, as the maximum percent difference of the cross-sectional flow profiles at all positions along the width of the die. In another embodiment, the difference of the cross-sectional flow profiles can be calculated as the average percent difference of the cross-sectional flow profiles along the width of the die. The predetermined difference value can be, for example, about 10%. The process is repeated iteratively until a convergence of the pressure and profile is observed. As illustrated in FIG. 3A, the nature of the method generates a monotonically decreasing series of pressure values for 0, $2^{nd}$, $4^{th}$, etc. approximations and a monotonically increasing pressure values for $1^{st}$, $3^{rd}$, $5^{th}$, etc. approximations. As illustrated in FIG. 3B, the nature of the method generates a monotonically increasing series of deflection values for 0, $2^{nd}$, $4^{th}$, etc. approximations and a monotonically decreasing deflection values for $1^{st}$, $3^{rd}$, $5^{th}$, etc. approximations.

Once convergence of the pressure and the cross-sectional flow profile is observed, the last calculated cross-sectional flow profile is analyzed to determine if the variation in the flow profile is within a predetermined tolerance range. If the variation in the cross-sectional flow profile is not within the predetermined tolerance range, the predetermined die design can be modified to compensate for the die cavity deformation calculated by the method. The method can then be re-run using the modified die cavity design as the predetermined die design. If the variation in the cross-sectional flow profile is within the predetermined tolerance range, then the predetermined die design will be suitable to extrude the desired cross-sectional flow profile dimensions.

The predetermined tolerance range can be a variation of the cross-sectional flow profile of about 0% to about 10%, about 2% to about 8% or about 4% to about 6%. Other suitable tolerances include about 0, 1, 2, 3, 4, 5, 6, 7, 8, 9, and 10%.

The method can be applied to an existing or predetermined die design to calculate the deformation of the die as used in an extrusion process. The method can then further be used to develop a suitable die cavity design to compensate for such deformation. The results of the method can be used to either develop a new die design or to modify an existing die design to compensate for die cavity deformation. Such modification of an existing die design can include, for example, modification of at least one of the dimensions of the die design and/or application of a restriction force on a portion of the die design. For example, the predetermined die design can be modified to increase a thickness of the die cavity wall in the portion of the die cavity experience the greatest deformation as determined by the structural analysis of the method. The restriction force can be provided, for example, by a plate exerting a force across the entire die cavity. An example of a suitable modification is illustrated in FIG. 4.

The Set of Data Inputs Related to the Die Cavity Design

In accordance with an embodiment of the disclosure, the method includes receiving a set of flow analysis data inputs related to the characteristics of the predetermined die cavity design, including characteristics of the geometry of the predetermined die cavity design. FIG. 4 is a schematic illustration of one type of possible die cavity. The predetermined die cavity design can be, for example, an existing die cavity design to which modifications may be necessary to improve the uniform extrusion performance of the die. The method further includes receiving a set of flow analysis data inputs on the computer device related to the characteristics of the deformed die cavity as calculated by the structural analysis, including the geometry of the die cavity having the calculated deformation.

The set of inputs related to the geometry of the predetermined die cavity design and/or the deformed die cavity can include, for example, the die cavity dimensions. For example, the set of inputs related to the geometry of the die cavity design can include the die cavity width, the die cavity length, the height of the gap at the exit portion of the die cavity, the die cavity wall thickness, and combinations thereof.

The method further includes receiving a set of structural analysis data inputs related to the material properties of the die cavity and the fastening constraints exerted on the die cavity. For example, the material properties of the die cavity can include the material or materials from which the die cavity is formed, the rigidity of the die cavity, the Young's modulus for the die cavity materials, the yield strength for the die cavity materials, the density of the die cavity materials, the ultimate tensile strength, Poisson's ratio, the thermal coefficient of expansion for the die cavity materials, and combinations thereof. The fastening constraints exerted on the die cavity related to the force or torque exerted by the fasteners used to hold together the die cavity. For example, the fastener constraints can include the force exerted by the die body bolts, the side plate bolts, and a combination thereof.

The set of structural analysis data inputs can further include the temperature of the material during the extrusion process, the thermal coefficient of the die cavity, and the temperature of the die cavity prior to extrusion. Typically, the temperature of the die cavity prior to extrusion will be the ambient temperature. Inclusion of the processing temperature data in addition to the thermal expansion properties of the die cavity can allow the structural analysis to account for thermal expansion of the die cavity resulting from processing of the material at elevated temperature.

Any known or developed die cavity design can be used as the predetermined die cavity design. The die can be formed, for example, of steel, aluminum, stainless steel, or combinations thereof. For example, the die cavity can have a width of about 0.1 m to about 3 m, about 0.4 m to about 2.5 m, about 0.8 m to about 2 m, about 1 m to about 3 m, about 1.2 m to about 2.8 m, about 1.4 m to about 2.6 m, about 1.5 m to about 2.4 m, about 1.6 m to about 2.2 m, or about 1.8 m to about 2 m. Other suitable die cavity widths include, for example, about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, and 3 m.

The die cavity wall can have a thickness, for example, of about 5 mm to about 600 mm, about 10 mm to about 500 mm, about 20 mm to about 400 mm, about 40 mm to about 300 mm, about 60 mm to about 200 mm, about 80 mm to about 100 mm, about 25 mm to about 130 mm, about 50 mm to about 120 mm, about 75 mm to about 100 mm, or about 25 mm to about 90 mm. Other suitable die cavity wall thicknesses include, for example, about 5, 10, 15, 20, 25, 30, 35, 40, 45, 50, 55, 60, 65, 70, 75, 80, 85, 90, 95, 100, 120, 140, 160, 180, 200, 220, 240, 260, 280, 300, 320, 340, 360, 380, 400, 420, 440, 460, 480, 500, 520, 540, 560, 580, and 600 mm.

The Set of Data Inputs Related to the Rheological Properties of the Material

The set of data inputs for the flow analysis further include data related to the rheological properties and density of the material to be extruded and the flow rate of the material through the die cavity. The rheological properties of the material to be extruded can include, for example, shear viscosity, extensional viscosity, elongational viscosity, viscoelasticity, and combinations thereof. The density and rheological properties of the material can be provided as a function of temperature or can be provided for a given processing temperature of the material to be extruded.

The material to be extruded can be, for example, a polymer melt, a filled polymer melt, an emulsion, a high internal phase emulsion (HIPE), a hydrogel, a paste, or a slurry. Rheological modeling of such materials requires certain data, including, for example, the viscosity as a function of shear rate and yield stress.

The Flow Analysis

The flow analysis is performed to determine the pressure exerted on the die cavity wall by the material as it is extruded through the die cavity. The pressure exerted on the die cavity wall calculated by the flow analysis includes at least the hydrodynamic force exerted on the die cavity wall. The flow analysis can be a three-dimensional flow analysis, which can enhance the accuracy of the method. For example, the three-dimensional flow analysis can be performed using commercially available flow analysis software. Any suitable flow analysis software can be used, such as, for example, ACUSOLVE (AcuSim Software) and FLUENT (ANSYS).

The pressure exerted on the die cavity calculated by the flow analysis can be plotted as a function of die cavity position using an interpolation method to determine the pressure distribution across the die cavity. This pressure distribution can then be input into the structural analysis. The pressure can be plotted, for example, using post processing software. For example, commercially available ENSIGHT (CEI, Inc.) software can be used to plot the pressure distribution. The pressure distribution can be plotted, for example, using a piecewise linear distribution interpolation method that is independent of span-wise variation. Alternatively, more accurate interpolation methods, such as, for example, the higher order quadratic and cubic schemes, can be used. In yet another embodiment, the die cavity can be divided into smaller sections and an appropriate interpolation method can be used on each section to more accurately approximate the pressure distribution. For example, a different interpolation method can be applied to each section.

The Structural Analysis

Figure 5:
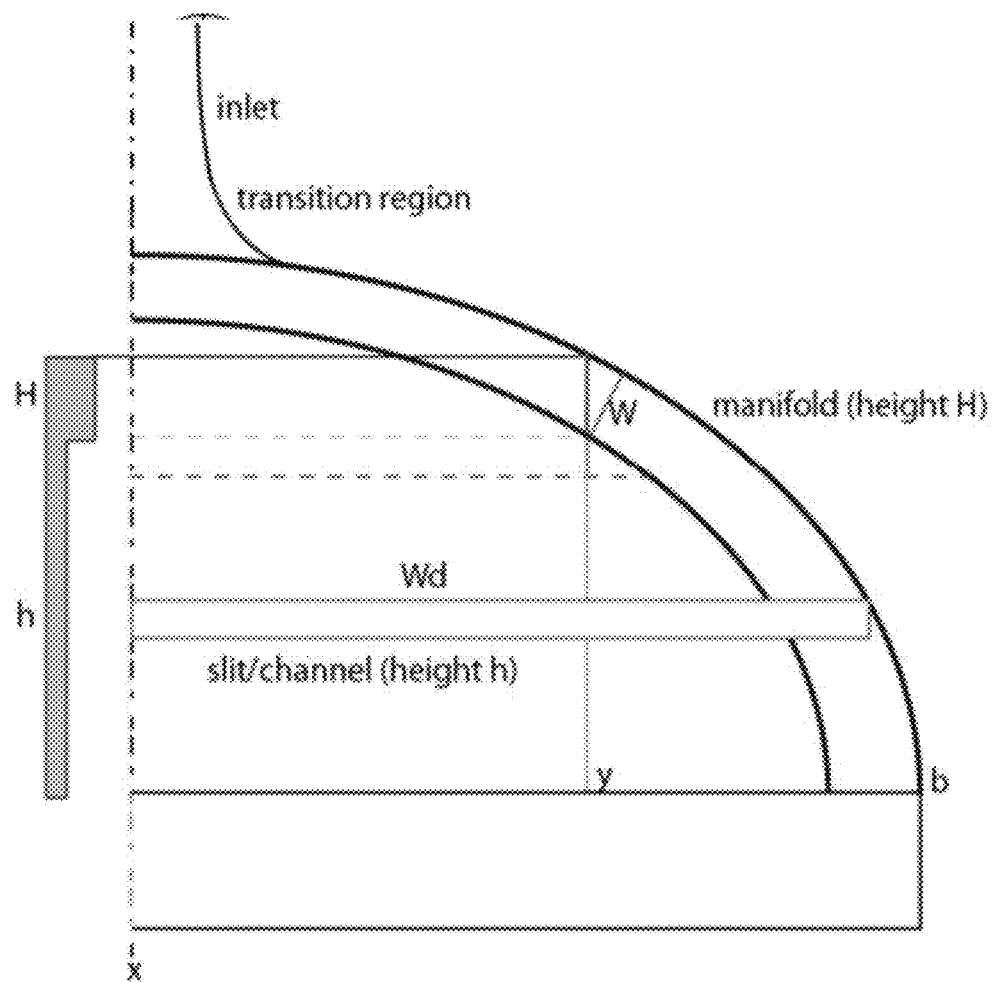
FIG. 5 is a schematic illustration of a die cavity.

The calculated pressure exerted on the die cavity wall or the pressure distribution as determined from post-processing of the calculated pressure can then be input into a structural analysis to determine the deformation on the die cavity resulting from the pressure exerted on the die cavity. FIG. 5 illustrates the die cavity deformation that can result. Additionally, external forces acting on the die cavity, such as, for example, gravity, can be included to provide a more robust model of the deformed die cavity. The structural analysis can further account for the thermal expansion of the die cavity resulting from processing the material at elevated temperature.

The structural analysis can be performed, for example, using commercially available software. Suitable commercially available software includes, for example, COSMOS (Solidworks) and LS-DYNA (LSTC). For example, the pressure exerted on the die cavity wall calculated by the flow analysis and plotted using the post-processing software can be input into the structural analysis software to determine the deformation on the die cavity resulting from the pressure exerted on the die cavity.

EXAMPLES

Example 1

Figure 7:
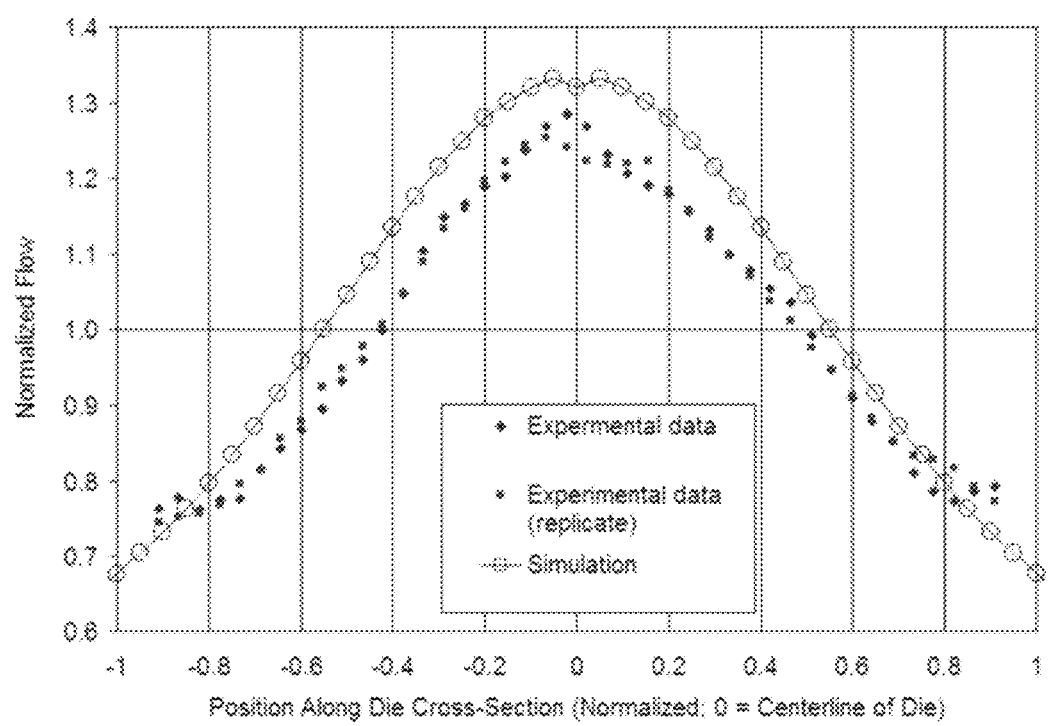
FIG. 7 is a graph comparing the normalized cross-sectional flow profile calculated by a method of designing a die cavity in accordance with an embodiment of the disclosure with the actual measured profile for the die cavity.

A Predetermined Die Cavity Design Having a Relatively High Die Width Aspect Ratio The method in accordance with embodiments of the disclosure was performed using a predetermined die cavity design having a die width aspect ratio of about 15.4. This die was intended to deliver a uniform cross-sectional flow, but produced a very uneven flow profile as a result of the die deformation. Referring to FIG. 7, a comparison of the calculated cross-sectional flow profile to the actual, measured cross-sectional flow profile, confirmed that the method provides a good approximation of the actual cross-sectional flow profile.

Example 2

Figure 6:
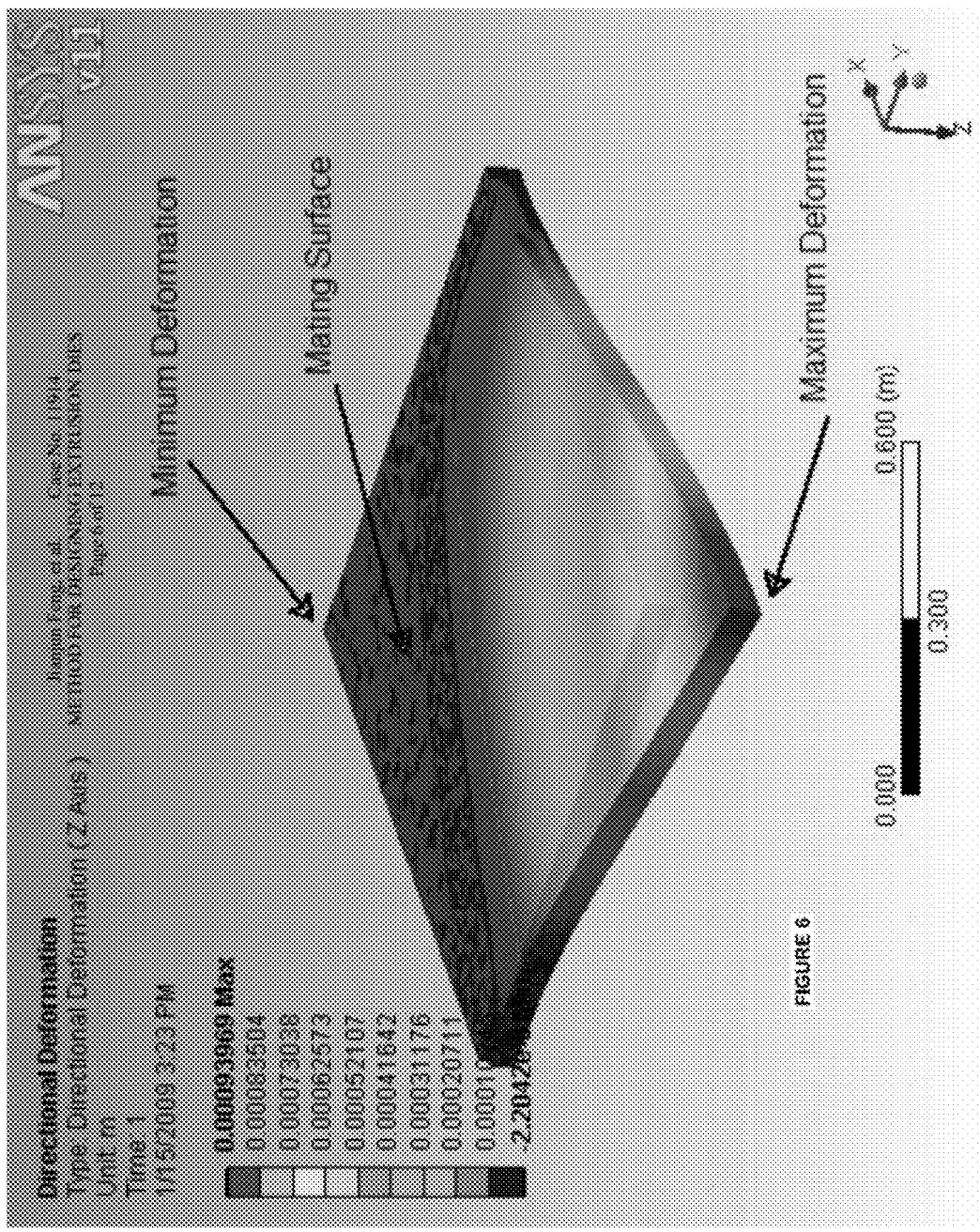
FIG. 6 is an ANSYS analysis illustrating the deformation on the die cavity wall due to a linear pressure distribution exerted on the die cavity wall.

Effect of Removing Material from the Mating Surfaces of a Die Having a Relatively High Die Width Aspect Ratio The method in accordance with an embodiment of the disclosure was performed to determine whether removal of material from the mating surface of a relatively large die width aspect ratio would improve the cross-sectional flow profile of the die. Removing material from the mating surfaces of the die can exaggerate certain cavity dimensions, which for some die designs can redistribute some of the excess flow from the center of the die towards the edges of the die, thereby improving the cross-sectional flow profile of the die. The method was first performed using an unmodified die design having a die width aspect ratio of about 15.4 as the predetermined die design. The method was also performed using a modified die design as the predetermined die design. The modified die design had 0.56% of die material removed from the each mating surface of the unmodified die, raising the die width aspect ratio from about 15.4 to about 15.5. FIG. 6 illustrates the location of the mating surfaces of the die cavity.

Figure 8A:
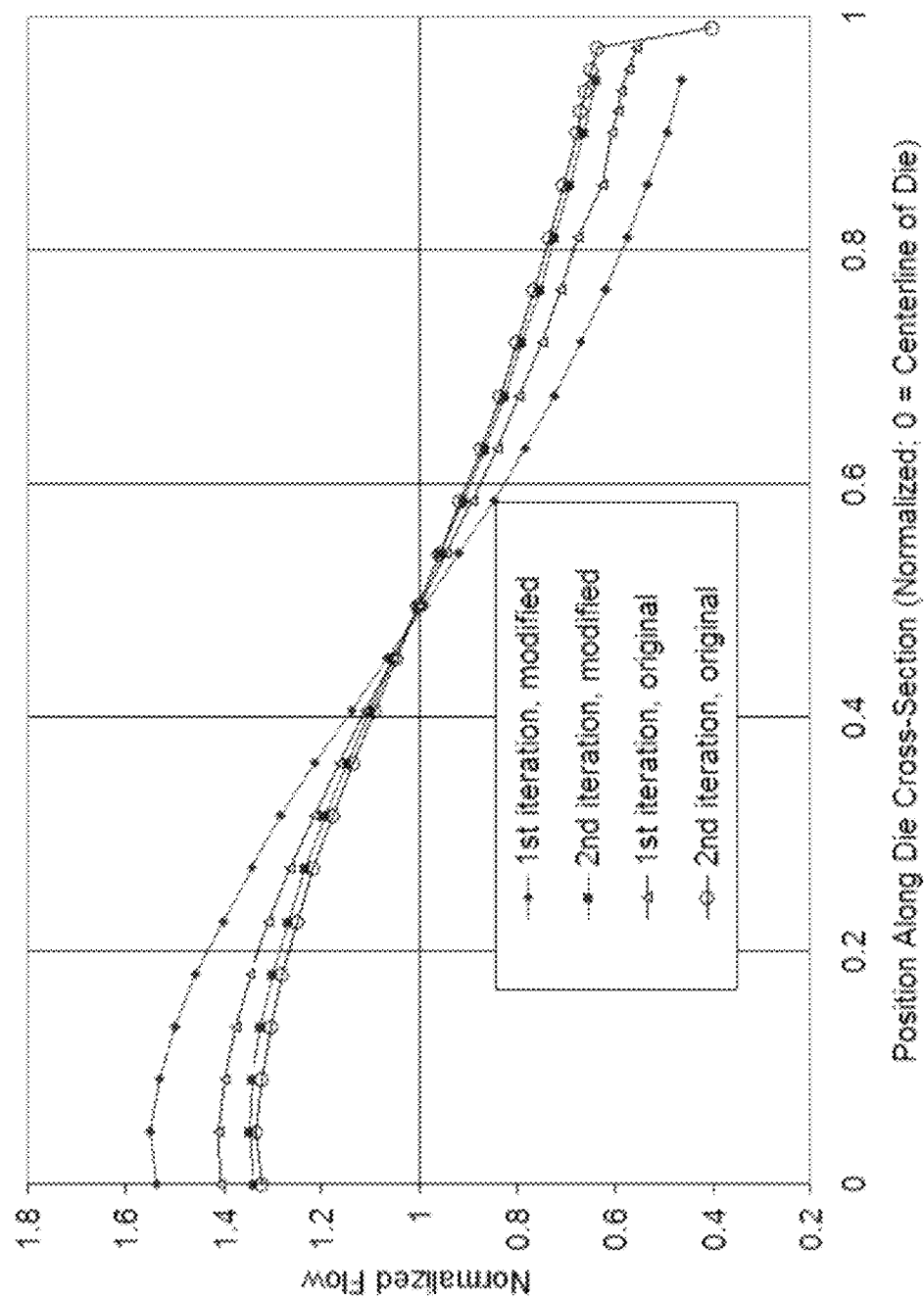
FIG. 8A is a graph illustrating the normalized cross-sectional flow profile calculated using a method of designing a die cavity in accordance with an embodiment of the disclosure.
Figure 8B:
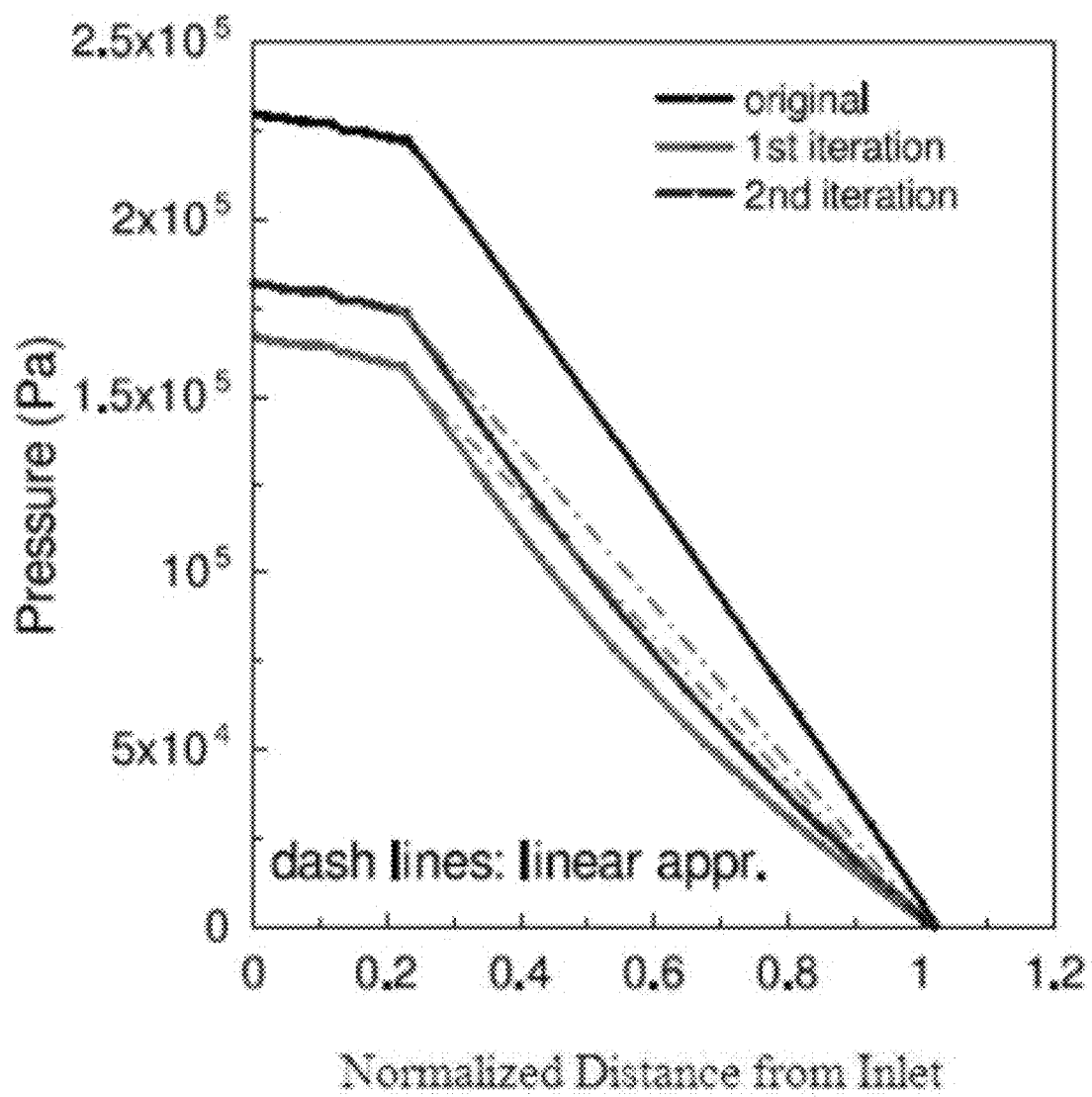
FIG. 8B is a graph illustrating the pressure exerted on the die cavity wall calculated using a method of designing a die cavity in accordance with an embodiment of the disclosure.

FIG. 8A illustrates the normalized cross-sectional flow profile calculated by the method for the original die design and a modified die design. FIG. 8B illustrates the pressure distribution calculated by the method for the original and modified die designs. FIGS. 8A and 8B illustrate the cross-sectional flow profile over half of the die. There is a line of symmetry through the center of the width of the die and, therefore, the cross-sectional flow profile for the remaining half of the die would mirror the cross-sectional flow profile illustrated in FIGS. 8A and 8B. The method in accordance with an embodiment of the invention allowed for the evaluation of the effectiveness of removing material from the mating surfaces in improving the cross-sectional flow profile. From the results of the simulation, it can be seen that the removal of material from the mating surfaces of a die having an aspect ratio of about 15.4 is not an effective strategy for improving the cross-sectional flow profile. Without intending to be bound by theory, it is believed that the benefits from exaggerating die cavity dimensions in such a die were unable to outweigh the poor cross-section flow profile caused by die flexing. The results also demonstrate that the pressure distribution was nearly piecewise linear in the flow direction, confirming that a piecewise linear load structural analysis can provide a good approximation of the die cavity deformation.

Example 3

Effect of Removing Material from the Mating Surfaces of a Die Having a Relatively Low Die Width Aspect Ratio The method in accordance with an embodiment of the disclosure was performed to determine whether removal of material from the mating surfaces of a die having a relatively low die width aspect ratio would improve the cross-sectional flow profile of the die. Removing material from the mating surfaces of the die was again considered as a method to exaggerate certain cavity dimensions, which for some die designs can redistribute some of the excess flow from the center of the die towards the edges of the die. The method was performed using an unmodified die design having a die width aspect ratio of about 9.8 as the predetermined die design. The method was also performed using a modified die design as the predetermined die design. The modified die cavity design had 0.56% of die material removed from the each mating surface of the unmodified die, raising the die width aspect ratio from about 9.8 to about 9.9.

Figure 9A:
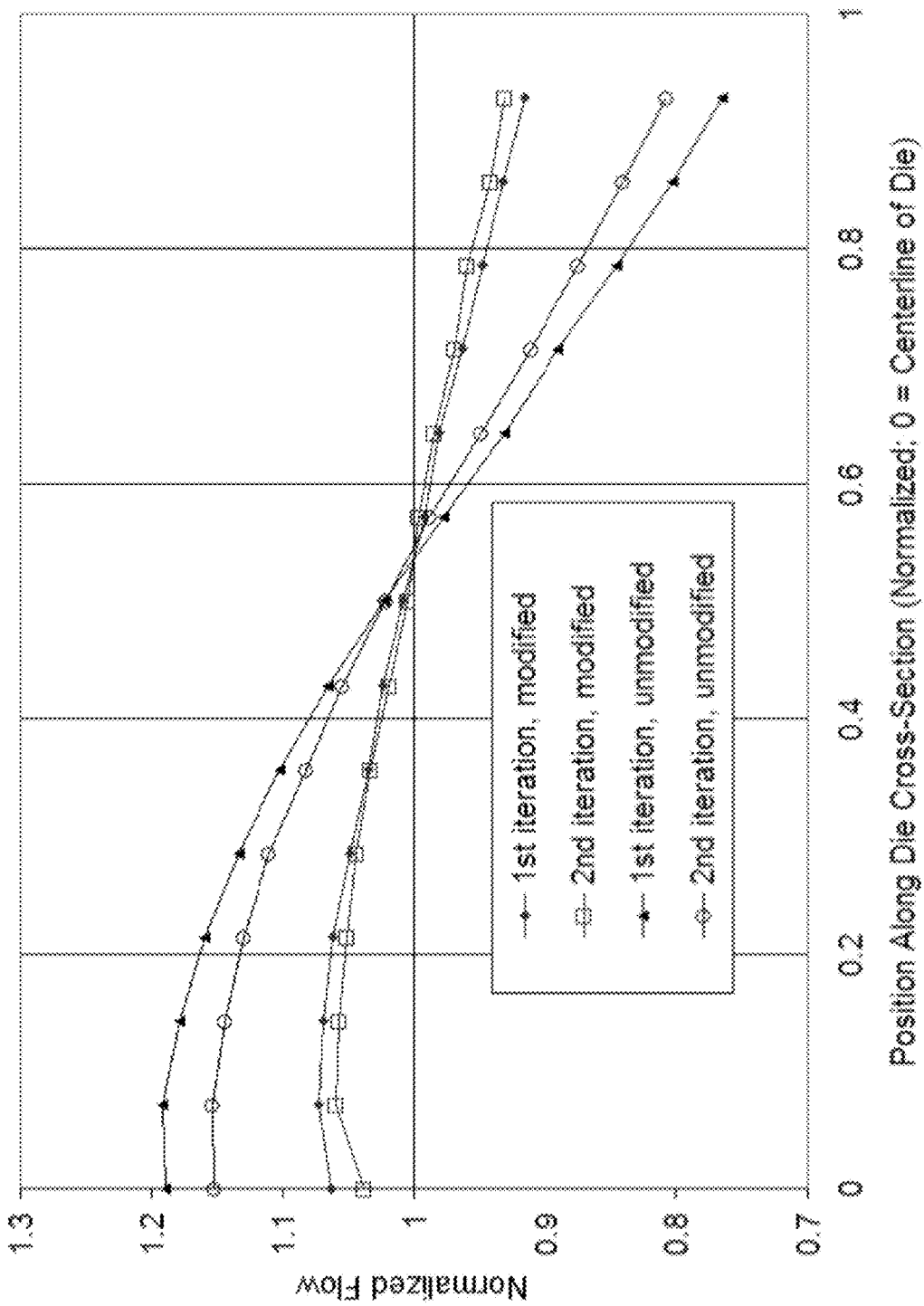
FIG. 9A is a graph illustrating the cross-sectional flow profile for a modified die cavity calculated using a method of designing a die cavity in accordance with an embodiment of the disclosure.
Figure 9B:
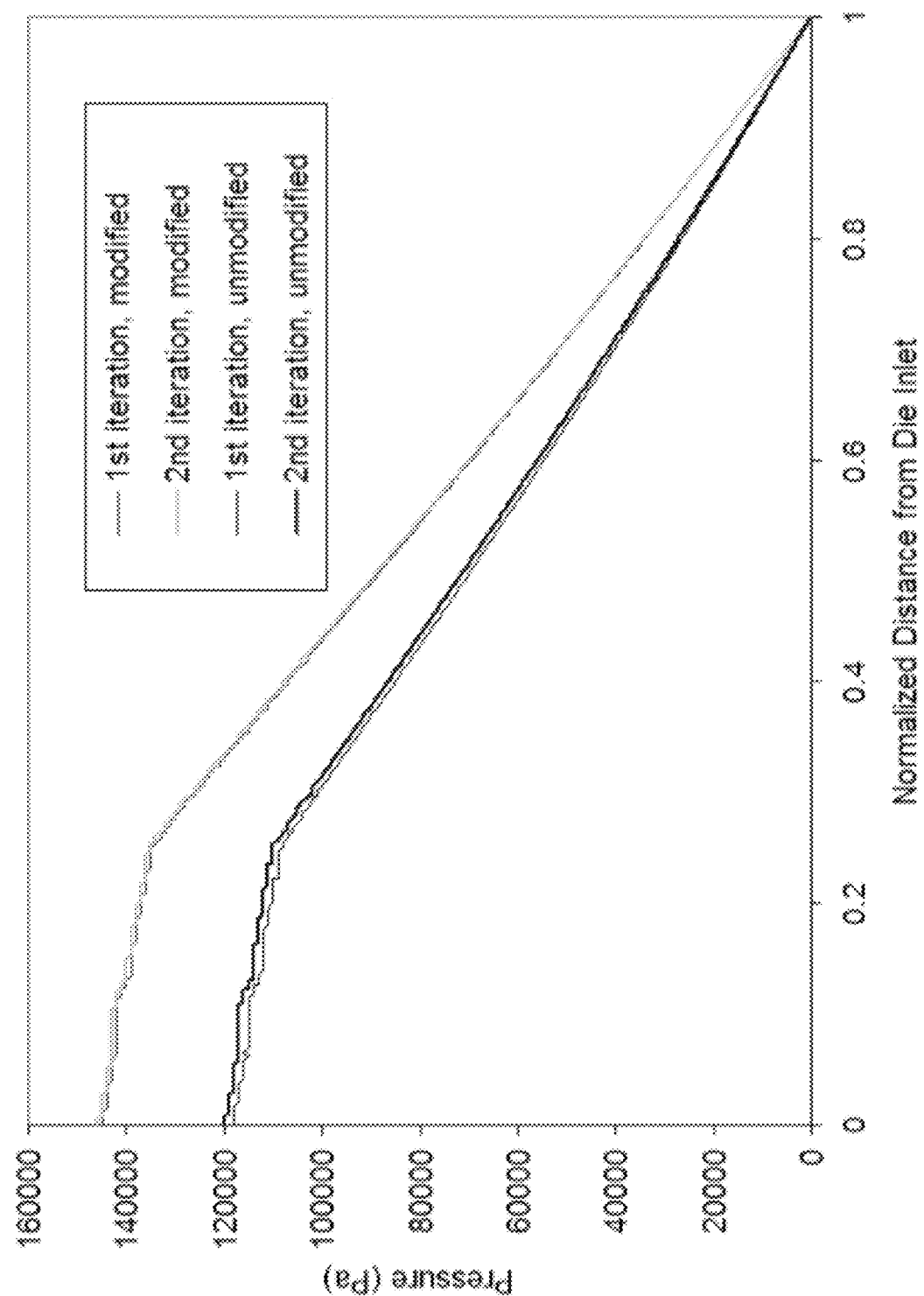
FIG. 9B is a graph illustrating the pressure exerted on the die cavity wall of a modified die cavity calculated using a method of designing a die cavity in accordance with an embodiment of the disclosure.

FIGS. 9A and 9B are graphs of the normalized cross-sectional flow profile and the pressure distribution, respectively, calculated using the method. As illustrated in FIGS. 9A and 9B, the removal of material from the mating surface of a die having a lower aspect ratio, such as 9.8, improved the cross-sectional flow profile. As with Example 2, the method in accordance with an embodiment of the invention allowed for the evaluation of the effectiveness of removing material from the mating surfaces in improving the cross-sectional flow profile. From the results of the simulation, it can be seen that the removal of material from the mating surfaces of a die having a lower aspect ratio is an effective strategy for improving the cross-sectional flow profile. Without intending to be bound by theory, it is believed that for a die having such a lower aspect ratio, the benefits from exaggerating die cavity dimensions are significant enough to overcome some of the poor cross-section flow profile issues caused by die flexing.

Example 4

Effect of Increasing the Die Thickness

Figure 10:
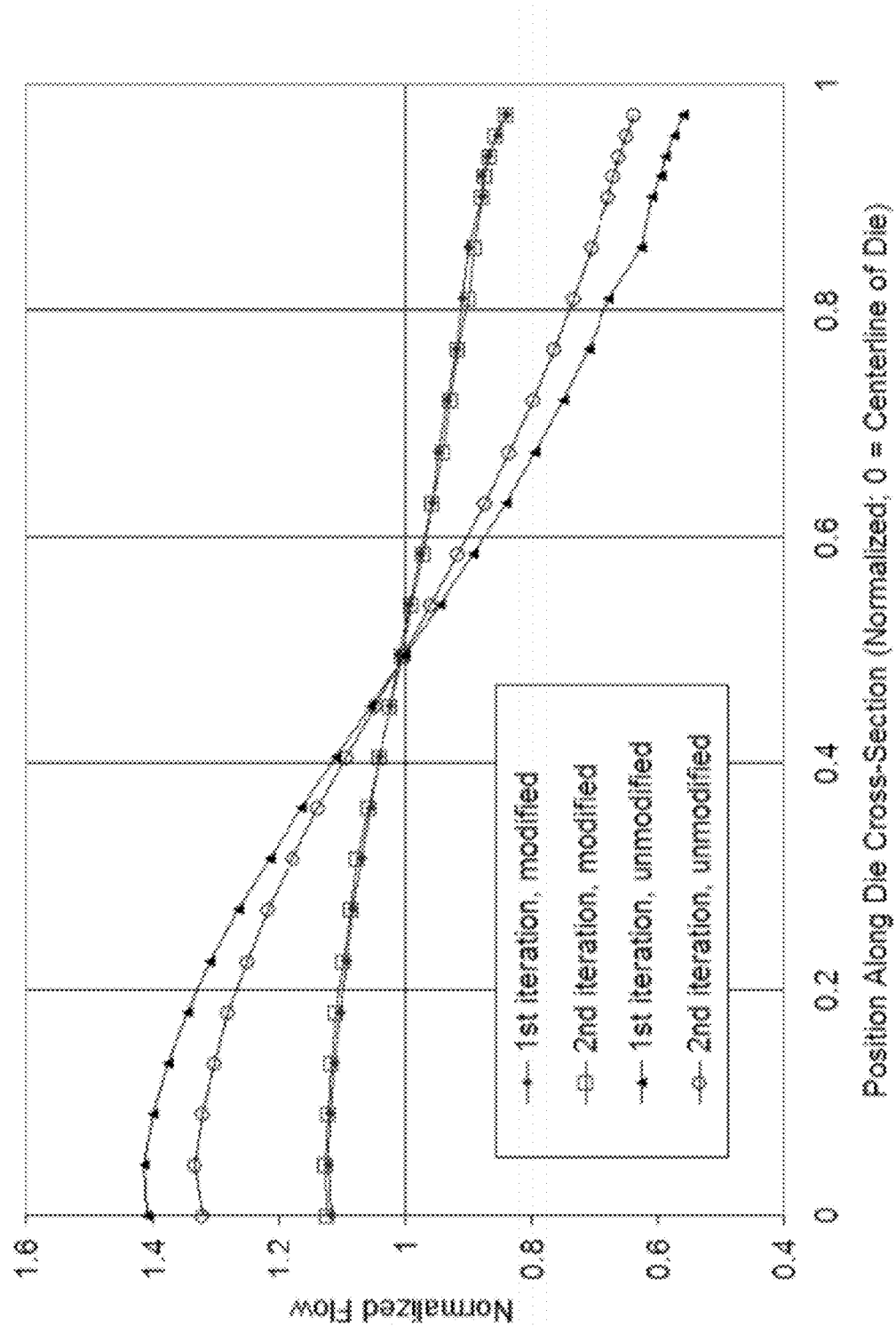
FIG. 10 is a graph illustrating the normalized cross-sectional flow profile for an unmodified (original) and modified die cavity calculated using a method of designing a die cavity in accordance with an embodiment of the disclosure.

The method in accordance with an embodiment of the disclosure was performed to evaluate whether changing the die width aspect ratio of a die by increasing the die thickness would improve the cross-sectional flow profile of the die cavity. A die with a die width aspect of 15.4 was used as the unmodified die design, and a die having a die width aspect ratio of 11.4 was used as the modified die design. The modified die design represented a die having an increased die thickness. As shown in FIG. 10, the normalized cross-sectional flow profile is significantly improved for the modified die design. The cross-sectional flow profile of the modified die cavity design exhibits a variance within the predetermined tolerance range. The method in accordance with an embodiment of the disclosure, thus, allowed for the evaluation of a new die design and a comparison of the cross-sectional flow profiles for unmodified and modified (i.e., the new) die designs. From the results of the method, it is believed that a thicker die body is an effective strategy for overcoming some of the poor cross-section flow profile issues caused by die flexing.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of designing a die, comprising:
a) receiving on a computer device a first set of flow analysis data inputs related to characteristics of a geometry of a predetermined die cavity, a density and rheological properties of a material to be extruded through the die, and a flow rate of the material;
b) performing a first three-dimensional flow analysis comprising calculating from the first set of flow analysis data inputs a first pressure distribution exerted on the die cavity by the material to be extruded through the die and a first cross-sectional flow profile at an exit of the die cavity;
c) receiving on the computer device a set of structural analysis data inputs related to fastener constraint forces exerted on the die cavity and material properties of the die cavity, wherein the material properties comprise Young's modulus, yield strength, density, ultimate tensile strength, Poisson's ratio, and wherein the set of structural analysis set of data inputs further comprises data inputs related to additional external forces exerted on the die cavity wherein the additional external forces comprise gravity;
d) performing a structural analysis of the die cavity comprising calculating from the calculated first pressure distribution and the set of structural analysis data inputs a deformation of the die cavity resulting from the first pressure distribution;
e) receiving on the computer device a second set of flow analysis data inputs related to characteristics of a geometry of the die cavity having the calculated deformation, the density and rheological properties of the material, and the flow rate of the material;
f) performing a second three-dimensional flow analysis comprising calculating from the second set of data inputs a second pressure distribution exerted on the deformed die cavity by the material to be extruded through the die and a second cross-sectional flow profile at the exit of the die cavity having the calculated deformation;
g) comparing at least one of (1) the first and second pressure distributions to determine if a difference between the first and second pressure distributions is less than a predetermined pressure difference value, and (2) the first and second cross-sectional flow profiles to determine if a difference between the first and second cross-sectional flow profiles is less than a predetermined difference value, wherein steps c)-g) are repeated using the pressure distribution calculated in step e) and the deformation calculated in step d) until at least one of (1) a difference between a pressure distribution calculated in step b) and a pressure distribution calculated in step f) is less than the predetermined pressure difference value, and (2) a difference between a cross-sectional flow profile calculated in step b) and a cross-sectional flow profile calculated in step e) is less than the predetermined difference value; and
h) analyzing the second cross-sectional flow profile to determine whether a variance in the cross-sectional flow profile is within a predetermined tolerance range.

2. The method of claim 1, further comprising (i) modifying the predetermined die cavity to compensate for the deformation resulting from the first pressure distribution and repeating the method of claim 1 using the modified die cavity as the predetermined die cavity, when the variance in the second cross-sectional flow profile is not within the predetermined tolerance range.

3. The method of claim 2, wherein modifying the predetermined die cavity design comprises applying a restriction force to at least a portion of the die cavity.

4. The method of claim 3, wherein the restriction force is provided by a plate exerting a force across the entire die cavity.

5. The method of claim 2, wherein modifying the predetermined die cavity design comprises changing at least one characteristic of the predetermined die cavity design.

6. The method of claim 5, wherein changing at least one characteristic of the predetermined die cavity design comprises providing a die cavity having increased wall thickness in a region of maximum deflection as determined by the structural analysis.

7. The method of claim 1, wherein the characteristic of the geometry of the predetermined die cavity are selected from the group consisting of die cavity width, a die cavity length, a height of the gap at the exit portion of the die cavity, a die cavity wall thickness, the die width aspect ratio, and combinations thereof.

8. The method of claim 7, wherein the die has a die width aspect ratio of about 5 to about 20.

9. The method of claim 1, wherein the rheological properties of the material to be extruded are selected from the group consisting of shear viscosity, extensional viscosity, elongational viscosity, viscoelasticity, yield stress, and combinations thereof.

10. The method of claim 1, wherein the set of structural analysis data inputs further comprise a thermal expansion coefficient of the predetermined die cavity, a processing temperature of the material to be extruded, and a temperature of the die cavity prior to extrusion of the material.

11. The method of claim 10, wherein performing the structural analysis comprises calculating from the set of structural analysis data inputs the deformation of the die cavity resulting from the first pressure distribution and the thermal expansion of the die cavity.

12. The method of claim 1, wherein the first and second pressures distribution calculated from the first and second three-dimensional flow analysis each comprise a hydrodynamic pressure distribution exerted on the die cavity by the material to be extruded.

13. The method of claim 1, wherein the material to be extruded is selected from the group consisting of a polymer melt, a filled polymer melt, a polymer solution, a emulsion, a high internal phase emulsion, a hydrogel, a paste, and a slurry.

14. The method of claim 1, further comprising plotting the calculated first pressure as a function of die cavity position using an interpolation method to determine a first pressure distribution, wherein the structural analysis is performed using the first pressure distribution.

15. The method of claim 14, wherein the interpolation method is selected from the group consisting of a piecewise linear interpolation method, a quadratic interpolation method, a cubic interpolation method, and combinations thereof.

16. The method of claim 14, wherein plotting the calculated first pressure as a function of die cavity position comprises dividing the die cavity into two or more sections and interpolating the first pressure distribution for each section.

17. The method of claim 16, wherein interpolating the first pressure distribution for each section comprises applying a different interpolation method to each section.

18. The method of claim 1, wherein the predetermined tolerance range is 0% to about 10%.

19. A method of designing a die, comprising:
   a) receiving on a computer device a first set of flow analysis data inputs related to characteristics of a geometry of a predetermined die cavity, a density and rheological properties of a material to be extruded through the die, and a flow rate of the material;
   b) performing a first three-dimensional flow analysis comprising calculating from the first set of flow analysis data inputs a first pressure distribution exerted on the die cavity by the material to be extruded through the die and a first cross-sectional flow profile at an exit of the die cavity;
   c) receiving on the computer device a set of structural analysis data inputs related to fastener constraint forces exerted on the die cavity and material properties of the die cavity, wherein the material properties comprise Young's modulus, yield strength, density, ultimate tensile strength, Poisson's ratio, and a thermal expansion coefficient of the predetermined die cavity, a processing temperature of the material to be extruded, and a temperature of the die cavity prior to extrusion of the material and wherein the set of structural analysis set of data inputs further comprises data inputs related to additional external forces exerted on the die cavity, wherein the additional external forces comprise gravity;
   d) performing a structural analysis of the die cavity comprising calculating from the calculated first pressure distribution and the set of structural analysis data inputs a deformation of the die cavity resulting from the first pressure distribution;
   e) receiving on the computer device a second set of flow analysis data inputs related to characteristics of a geometry of the die cavity having the calculated deformation, the density and rheological properties of the material, and the flow rate of the material;
   f) performing a second three-dimensional flow analysis comprising calculating from the second set of data inputs a second pressure distribution exerted on the deformed die cavity by the material to be extruded through the die and a second cross-sectional flow profile at the exit of the die cavity having the calculated deformation;
   g) comparing at least one of (1) the first and second pressure distributions to determine if a difference between the first and second pressure distributions is less than a predetermined pressure difference value, and (2) the first and second cross-sectional flow profiles to determine if a difference between the first and second cross-sectional flow profiles is less than a predetermined difference value, wherein steps c)-g) are repeated using the pressure distribution calculated in step e) and the deformation calculated in step d) until at least one of (1) a difference between a pressure distribution calculated in step b) and a pressure distribution calculated in step f) is less than the predetermined pressure difference value, and (2) a difference between a cross-sectional flow profile calculated in step b) and a cross-sectional flow profile calculated in step e) is less than the predetermined difference value; and h) analyzing the second cross-sectional flow profile to determine whether a variance in the cross-sectional flow profile is within a predetermined tolerance range.

* * * * *